United States Patent Office 3,776,950
Patented Dec. 4, 1973

3,776,950
N-CYANOPHOSPHINIMIDES
Ronald A. Mitsch, St. Paul, Minn., assignor to Minnesota Mining and Manufacturing Company, St. Paul, Minn.
No Drawing. Continuation-in-part of application Ser. No. 808,656, Mar. 19, 1969, which is a continuation-in-part of application Ser. No. 482,585, Aug. 25, 1965, both now abandoned. This application Nov. 26, 1971, Ser. No. 202,667
Int. Cl. C07d 27/56, 31/46, 63/00
U.S. Cl. 260—551 C          5 Claims

ABSTRACT OF THE DISCLOSURE

Novel substituted N-cyanophosphorus imides having a relatively high degree of hydrolytic stability are prepared by reacting a trivalent phosphorus compound with difluorodiazirine in the presence of an inert solvent. Such compounds have utility as pest control agents, corrosion inhibitors, plasticizers, flotation agents and petroleum additives.

This application is a continuation-in-part of my copending application Ser. No. 808,656, filed Mar. 19, 1969 now abandoned, which application was a continuation-in-part of my copending application U.S. Ser. No. 482,585 filed Aug. 25, 1965, now abandoned.

This invention relates to novel organophosphorus imides and more particularly to N-cyanoimide derivatives of organophosphorus compounds, and to a process of preparing said N-cyanoorganophosphorus imides.

Organic phosphorus compounds which contain an imide or imine group, and which are substituted by alkyl, aryl and other groups, are known and have been prepared generally by the reaction of azides with phosphines. However, these phosphorus imides are, in general, quite susceptible to hydrolysis, which is disadvantageous when they are to be used under conditions where the presence of moisture cannot be controlled.

Recently, the preparation of N-cyanotriphenylphosphinimide, $(C_6H_5)_3P=NC\equiv N$, from the reaction of cyanogen azide with triphenylphosphine, has been described by Marsh et al., J. Am. Chem. Soc., 86, 4506 (1964). However, so far as is known to applicant, no organic phosphorus compounds containing the N-cyanoimide group bonded to phosphorus in the molecule was known prior to his invention thereof, nor have the stability and highly useful properties of this class of compounds been recognized.

An object of this invention is to provide novel and useful organic phosphorus compounds containing the N-cyanoimide group bonded to phosphorus in the molecule.

Another object of this invention is to provide a class of organophosphorus imides many of which have a relatively high degree of hydrolytic stability.

A further object of the invention is to provide a novel process for the preparation of organic phosphorus compounds containing the N-cyanoimide moiety in the molecule. Other objects of the invention will become apparent from the disclosures hereinafter made.

The novel compounds of the invention are characterized by the presence of a cyano group covalently bonded to the nitrogen atom of the phosphorus imide. Thus, the nitrogen atom of the N-cyanoimide in addition to carrying the cyano group is doubly bonded to pentavalent phosphorus.

The compounds of the invention have the structure

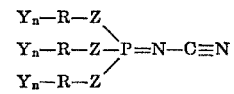

wherein Z is a divalent linking group of the class consisting of a carbon to phosphorus bond,

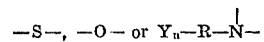

each R is alkyl having 1 to 16 carbon atoms, alkenyl having 2 to 6 carbon atoms, aryl having 6 to 14 carbon atoms, alkaryl having 7 to 12 carbon atoms, aralkyl having 7 to 15 carbon atoms or cycloalkyl having 3 to 6 carbon atoms; Y is halogen, nitro, cyano, carbonyl, acyl, carboalkoxy, hydroxy and alkoxy, $n$ is 0 to 3, provided that when R is methyl, $n$ is zero or one and when R is alkenyl, $n$ is zero; two of said R groups when alkyl and taken together with each other and the nitrogen linking radical to which they are attached can form a 5- to 6-membered ring system having a total of up to 9 carbon atoms; and two of said R—Z— groups when alkyl, alkoxy, alkylmercapto or alkoxy-alkyl when taken together with each other and the phosphorus atom can form a 5- to 6-membered ring system having a total of up to 12 carbon atoms, of which 4 carbon atoms can form part of an aromatic ring fused to the said 5- to 6-membered ring.

One of the R radicals can be substituted by another corresponding substituted N - cyano - phosphorus imide group, i.e., a group of the structure

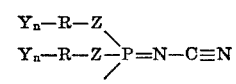

so as to form, e.g., bis-N-cyanophosphorus imide substituted compound.

When the linking groups —Z— of the above formula are a carbon to phosphorus bond, the compounds are named as phosphinimide derivatives, e.g., N-cyanotriethylphosphinimide. When the linking groups —Z— are —S— or —O—, the compounds are properly named as phosphoroimidates, e.g., N-cyano-S,S,S-tributyltrithiophosphoroimidate or N - cyano - O,O,O-triphenylphosphoroimidate, although they may, for convenience also, be designated as, e.g., N-cyanotributylmercaptophosphinimide or N-cyanotriphenoxyphosphinimide, respectively.

The compounds of this invention possess utility as pest-control agents, including insecticidal and rodenticidal properties among their characteristics. Certain of the compounds can also be used as herbicides, corrosion inhibitors, plasticizers, flotation agents and petroleum additives.

The N-cyanophosphorus imides of the above general formula are readily prepared by the reaction of a trivalent phosphorus compound of the general formula:

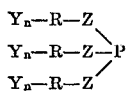

in which $Y_n$, R and Z have the meaning set forth above, with difluorodiazirine, having the formula:

This compound is disclosed in a publication by R. A. Mitsch, J. Heterocyclic Chem., 1, 59 (1964). The course of the reaction is shown by the following general equation:

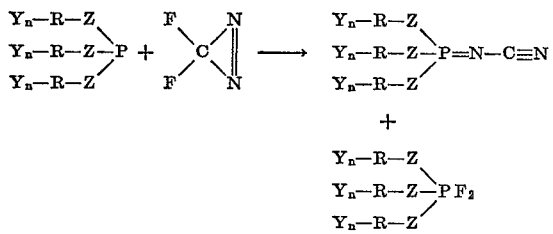

The stoichiometry of the reaction thus requires two moles of trivalent phosphorus compound per mole of difluorodiazirine. Varying the stiochiometric quantities of the reactants used has little effect on the products obtained in the reaction, the yield being dependent on the amount of reagent present in smallest amount.

The process of the invention is conveniently carried out by dissolving the trivalent phosphorus compound in a solvent in which it has at least moderate solubility and which is inert with respect to the reactants and products of the reaction at the temperature employed. In the case of a batch reaction, the difluorodiazirine, which is a gas boiling at about −91° C., is then introduced, e.g., by condensation or by pressurization. In a flow-through system, the difluorodiazirine is bubbled through a solution of the selected trivalent phosphorus compound in an inert solvent. The reaction is self-initiating and results in the formation of a mixture of the substituted N-cyanophosphorus imide and the corresponding pentavalent phosphorus difluoride.

The time and temperature required for the reaction vary widely, depending on the reactivity of the trivalent phosphorus reactant, the quantity of the reactants utilized and the dilution.

The reaction is preferably carried out at a temperature within the ring from about −100° C. to +100° C. In the case of highly reactive trivalent phosphorus compounds, the reaction is conveniently run at −78° C. in a Dry-Ice cooled reactor whereas with less reactive reagents stirring at room temperature is convenient. However, temperatures outside of the above range may be employed depending upon the type of reactant and solvents utilized. Use of a pressure vessel may be required, as will be apparent to the art from the highly volatile nature of the difluorodiazirine.

The reaction time is not critical but should be of sufficient length to permit the reaction to be completed. Ordinarily, one hour to one week is in most cases sufficient to give a useful yield. Since difluorodiazirine is a gas, even at −78° C., it is convenient to monitor the extent of completion of the reaction by infrared examination of the volatile components of the mixture. In this way, the course of the reaction can be followed and when the characteristic absorption peak of the diazirine ring disappears or is greatly weakened, the process can be terminated.

The products of the reaction are isolated by distillation, column chromatography or crystallization and combinations thereof. The two organophosphorus derivatives ordinarily have widely differing properties and are easily separated from each other and from the starting material.

The trivalent phosphorus compounds useful as starting materials for the preparation of N-cyanophosphorus imides are available commercially or can be prepared by synthesis techniques well known to the art. Procedures for preparation of these materials are set forth in "Organophosphorus Compounds," G. M. Kosolapoff, John Wiley and Sons, Inc., New York, 1950.

In general, the trivalent phosphorus reagents useful as starting materials vary considerably in their reactivity with difluorodiazirine. Starting materials which are substituted with a multiplicity of electron-donating groups, such as methoxy and dialkylamino groups, are highly reactive. In fact, compounds such as trimethylphosphite or tris(dimethylamino)phosphine can react explosively with difluorodiazirine if suitable precautions of cooling or dilution are not employed. On the other hand, trivalent phosphorus compounds which are substituted with electron-withdrawing substituents are sluggish to react.

The organic radicals of the trivalent phosphorus starting compounds can be unsubstituted or substituted. Among the substituents which can be present are halo, nitro, cyano, alkoxy, keto, carboxyl, acyl, carboalkoxy, hydroxyl and the like. These substituents do not interfere with the N-cyanophosphorus imide-forming reaction, and are not lost. Therefore the final products also can contain such substituents in the organic radicals $Y_n$—R—Z. One to three substituents are allowable on the organic radical except when the organic radical is an alkyl group having one carbon atom, e.g. methyl, then only a single substituent is allowable. Further, compounds containing more than one reactive, trivalent phosphorus atom can be used as starting materials. These react with difluorodiazirine in the same way to produce compounds which contain more than one N-cyanophosphorus imide group, and such compounds are contemplated by and included within the scope of the invention. Trivalent phosphorus compounds containing groups such as peroxide moieties are not presently disclosed in the literature, and the compounds which would be formed from such starting reactants do not constitute a part of this invention.

The inert solvent which is chosen for the preparation of any particular compound according to the invention will depend upon the trivalent phosphorus reactant and the conditions to be used. That is, under the conditions used it must be liquid, must be capable of dissolving at least a moderate amount of the reactants, and must be inert with respect to the materials present. Among the suitable solvents are dichloromethane, carbon tetrachloride, chloroform, acetonitrile, benzene, chlorobenzene, diglyme, acetone, etc. The boiling point of the solvent is not critical for the reaction although the lower boiling solvents are desirable because they facilitate isolation and recovery of the N-cyanophosphorus imide products.

The N-cyanophosphorus imides of the invention are generally colorless liquids or solids. They can be purified by high-vacuum distillation, recrystallization, solvent extraction, sublimation, solid-liquid absorption column chromatography and other related known techniques.

Specific examples of the N-cyanophosphorus imides of the invention include:

TABLE 1
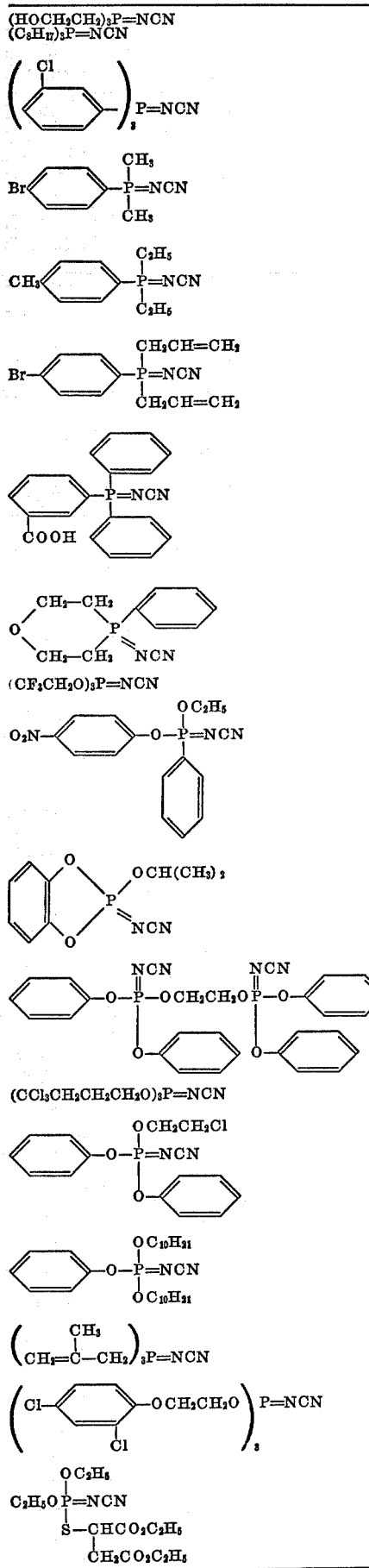
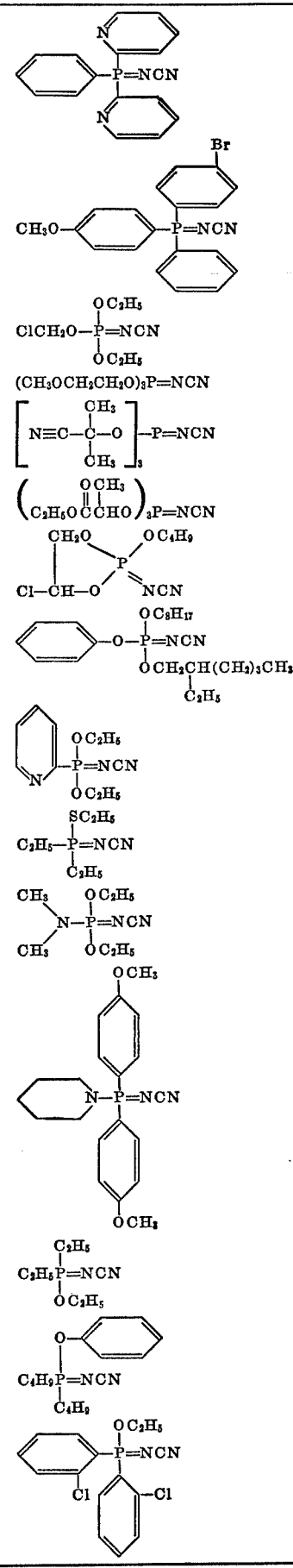

In order to disclose more clearly the process and compounds of the invention in the best mode presently contemplated, a number of specific examples will now be given. All parts are by weight unless otherwise designated.

EXAMPLE 1

This example illustrates the procedure used in preparing the compounds of the invention from substituted phosphines and difluorodiazirine, where all of the latter reactant is added initially and the process operates as a batch process. Triphenylphosphine is to be understood as representative of a broad range of benzene-soluble phosphines. It will be understood that the nature of the phosphines will determine the solvent to be used in the reaction mixture, while the temperature employed and the time during which the reaction is carried out depend both upon the reactivity of the substituted phosphine which is employed and the yield required.

A solution of 7.86 grams of triphenylphosphine and 25 ml. of benzene is placed in a 50 ml. glass reactor fitted with a polytetrafluoroethylene valve and containing a magnetic stirring bar. The solution is cooled to liquid nitrogen temperature, degassed by reducing the pressure in the reactor to less than 0.1 mm. of mercury, and 1.17 grams of difluorodiazirine are added by condensing the gas into the cold reactor. The apparatus and the reaction mixture are then allowed to warm to room temperature, and stirring is begun and continued for 24 hours. At this time, a colorless solid precipitate, comprising N-cyanotriphenylphosphinimide, has appeared and is removed by filtering. The product is recrystallized twice from benzene; about 3.15 grams (about 70 percent yield) of colorless needles are obtained, melting at 194–196° C.

*Analysis.*—Calculated for $C_{19}H_{15}N_2P$ (percent): C, 75.5; H, 4.97; N, 9.3; P, 10.3. Found (percent): C, 75.7; H, 5.0; N, 9.7; P, 10.2.

The triphenylphosphorus difluoride which is the other part of the reaction remains in the filtrate from the reaction mixture, while a small amount of this material is also recovered from the filtrate from recrystallization of the desired product.

The following table is illustrative of other phosphines usable as starting materials and the resulting products using the procedure of Example 1.

TABLE II

| Phosphine starting material | Product |
|---|---|
| $(ClCH_2)_3P$ | $(ClCH_2)_3P=NCN$ |
| $(CH_3CH(OH)-CH_2)_3P$ | $(CH_3CH(OH)-CH_2)_3P=NCN$ |
| $(CH_2=CH-CH_2)_3P$ | $(CH_2=CH-CH_2)_3P=NCN$ |
| $(C_6H_5-CH_2)_3P$ | $(C_6H_5-CH_2)_3P=NCN$ |
| $(o-CH_3O-C_6H_4)_3P$ | $(o-CH_3O-C_6H_4)_3P=NCN$ |
| $(2,4,6-(CH_3)_3C_6H_2)_3P$ | $(2,4,6-(CH_3)_3C_6H_2)_3P=NCN$ |
| (naphthyl)$_3$P | (naphthyl)$_3$P=NCN |
| (indolyl)$_3$P | (indolyl)$_3$P=NCN |
| $C_6H_5-O-C_6H_4-P(CH_3)_2$ | $C_6H_5-O-C_6H_4-P(CH_3)_2=NCN$ |
| $C_6H_5-CH_2-CH_2-P(CH_3)_2$ | $C_6H_5-CH_2-CH_2-P(CH_3)_2=NCN$ |
| $(C_2H_5)_2P-C_6H_4-OH$ | $(C_2H_5)_2P=NCN$ (with $C_6H_4OH$) |
| (2-methylindolyl)$_3$P | (2-methylindolyl)$_3$P=NCN |

TABLE II—Continued

| Phosphine starting material | Product |
|---|---|
| [9-bromoanthracen-10-yl]$_3$P | [9-bromoanthracen-10-yl]$_3$P=NCN |
| (biphenyl-4-yl)$_3$P | (biphenyl-4-yl)$_3$P=NCN |
| (CH$_3$CH$_2$)$_2$P(2-thienyl) | (CH$_3$CH$_2$)$_2$P(=NCN)(2-thienyl) |
| (CH$_2$=CHCH$_2$)$_2$P(4-bromophenyl) | (CH$_2$=CHCH$_2$)$_2$P(=NCN)(4-bromophenyl) |
| 2,3-dihydro-1H-phosphindole with P-(4-methylphenyl) | same phosphindole with P=NCN and 3-methylphenyl |
| Ph$_2$P-CH$_2$CH$_2$-(2-CH$_2$OCH$_3$-C$_6$H$_4$) | Ph$_2$P(=NCN)-CH$_2$CH$_2$-(2-CH$_2$OCH$_3$-C$_6$H$_4$) |
| (imidazol-1-yl)$_3$P | (imidazol-1-yl)$_3$P=NCN |
| 1,3-(CH$_2$)$_2$N-P(phenyl)$_2$ | 1,3-(CH$_2$)$_2$N-P(=NCN)(phenyl)$_2$ |
| C$_{12}$H$_{25}$P(cyclobutane) | C$_{12}$H$_{25}$P(=NCN)(CH$_2$CH$_2$CH$_2$CH$_2$) |
| phospholane-P-phenyl | phospholane-P(=NCN)-phenyl |

TABLE II—Continued

| Phosphine starting material | Product |
|---|---|
| C₁₆H₃₃P(C₆H₅)₂ | C₁₆H₃₃P(C₆H₅)₂=NCN |

EXAMPLE 2

The following is a specific example of a nitrogen-interrupted alkyl chain-substituted phosphine and is exemplary of hetero-atom interrupted trivalent phosphorus compounds in general.

A solution of 11.56 grams of tris(diethylaminomethyl) phosphine and 40 ml. of methylene chloride is placed in a 75 ml. glass reactor fitted with a polytetrafluoroethylene needle valve and containing a magnetic stirring bar. The solution is cooled to liquid nitrogen temperature, degassed by reducing the pressure in the reactor to less than 0.1 mm. of mercury, and 2.0 grams of difluorodiazirine are added by condensing the gas into the cold reactor. The reactor and reaction mixture are then allowed to warm to −78° C. and then stirring is begun at that temperature and continued for one day.

The solvent is then removed by distillation and the semi-solid crude product is subjected to two extractions at 60° C. with heptane. Cooling the heptane extract initiates crystallization. Filtration is employed to collect about 4 grams (about 61 percent yield) of a colorless solid melting at 90–92° C.

*Analysis.*—Calculated for $C_{16}H_{36}N_5P$ (percent): C, 58.4; H, 10.9; N, 21.3; mol. wt., 329. Found (percent): C, 57.2; H, 10.9; N, 21.4; mol. wt., 320.

Other nitrogen-interrupted alkyl chain-substituted phosphine products and their starting materials are set out below in Table III.

EXAMPLE 3

This example illustrates the procedure used in preparing compounds of the invention from substituted phosphites and difluorodiazirine.

O,O-diethyl - O - (2 - ethylthioethyl)phosphite is to be understood as representative of a broad range of methylene chloride soluble phosphites. It will be understood that the nature of the phosphites will determine the solvent to be used in the reaction mixture, while the temperature employed, and the time during which the reaction is carried out, depend both upon the reactivity of the substituted phosphite which is employed and the yield required.

Following the procedure outlined in Example 1, a solution of 9.04 grams of O,O-diethyl-O-(2-ethylthioethyl)phosphite, made by the procedure of Hoffman et al., J. Am. Chem. Soc., 80, 1150 (1958), dissolved in 25 ml. of methylene chloride is reacted with 2.0 grams of difluorodiazirine. The reaction mixture is stirred at room temperature for 4 days, after which the solvent and unreacted difluorodiazirine are removed by distillation.

The oily crude product is purified by liquid column chromatography on a column composed of silica gel and employing chloroform and ethyl acetate as eluents. About 0.7 gram of purified N-cyano-O,O-diethyl-O-(2-ethylthioethyl)phosphoroimidate is collected after evaporation of the ethyl acetate eluent. The product is identified by infrared spectroscopy.

TABLE III

| Phosphine starting material | Product |
|---|---|
| [(CH₃)₂N—C₆H₄—]₃P | [(CH₃)₂N—C₆H₄—]₃P=NCN |
| [(C₂H₅)₂N—C₆H₄—]₃P | [(C₂H₅)₂N—C₆H₄—]₃P=NCN |
| (C₄H₉)₂P—C₆H₄—N(CH₃)₂ | (C₄H₉)₂P(=NCN)—C₆H₄—N(CH₃)₂ |

Further examples of compounds prepared from substituted phosphites according to the procedure described in Example 3 are set forth in Table IV below.

The residue is heated to 90° C. under vacuum and the byproduct, tris(dimethylamino) phosphorus difluoride is removed by fractionation.

TABLE IV

| Phosphite starting materials | Product |
|---|---|
| $(Cl-\underset{Cl}{\bigcirc}-O-C_2H_4O\underset{3}{\longrightarrow})P$ | $(Cl-\underset{Cl}{\bigcirc}-O-C_2H_4O\underset{3}{\longrightarrow})P=NCN$ |
| $(HC\equiv C-\underset{CH_3}{\overset{CH_3}{C}}-O\underset{3}{\longrightarrow})P$ | $(HC\equiv C-\underset{CH_3}{\overset{CH_3}{C}}-O\underset{3}{\longrightarrow})P=NCN$ |
| $(Cl-\underset{F}{\overset{F}{C}}-\underset{CH_3}{\overset{CH_3}{C}}-O\underset{3}{\longrightarrow})P$ | $(Cl-\underset{F}{\overset{F}{C}}-\underset{CH_3}{\overset{CH_3}{C}}-O\underset{3}{\longrightarrow})P=NCN$ |
| $(H_2C\overset{O}{\underset{\diagup\diagdown}{}}CHCH_2-O\underset{3}{\longrightarrow})P$ | $(H_2C\overset{O}{\underset{\diagup\diagdown}{}}CHCH_2-O\underset{3}{\longrightarrow})P=NCN$ |
| $(C_9H_{19}-\bigcirc-O\underset{3}{\longrightarrow})P$ | $(C_9H_{19}-\bigcirc-O\underset{3}{\longrightarrow})P=NCN$ |
| $(\underset{O}{\bigcirc}-O\underset{3}{\longrightarrow})P$ | $(\underset{O}{\bigcirc}-O\underset{3}{\longrightarrow})P=NCN$ |
| $(\underset{Cl}{\bigcirc}-O\underset{2}{\longrightarrow})P-O-\bigcirc-CH(CH_3)_2$ | $(\underset{Cl}{\bigcirc}-O\underset{2}{\longrightarrow})\overset{O-\bigcirc-CH(CH_3)_2}{\underset{\|}{P}}=NCN$ |
| $[\bigcirc\bigcirc-O\underset{3}{\longrightarrow}]P$ | $[\bigcirc\bigcirc-O\underset{3}{\longrightarrow}]P=NCN$ |
| $\underset{O}{\overset{O}{\bigcirc}}P-OCH_2CH_2Cl$ | $\underset{O}{\overset{O}{\bigcirc}}\overset{OCH_2CH_2Cl}{P}=NCN$ |
| $\underset{O}{\overset{O}{\bigcirc}}P-O-C_4H_9$ | $\underset{O}{\overset{O}{\bigcirc}}\overset{O-C_4H_9}{P}=NCN$ |
| $\underset{O}{\overset{O}{\bigcirc}}P-O-C_3H_7$ | $\underset{O}{\overset{O}{\bigcirc}}\overset{O-C_3H_7}{P}=NCN$ |
| $(\bigcirc-CH_2O\underset{3}{\longrightarrow})P$ | $(\bigcirc-CH_2O\underset{3}{\longrightarrow})P=NCN$ |

EXAMPLE 4

This example is exemplary of phosphines to which nitrogen atoms are bonded directly to the trivalent phosphorus. According to the procedure outlined in Example 2, 6.52 grams of tris(dimethylamino) phosphine, made by the procedure of Burg et al., J. Am. Chem. Soc., 80, 1107 (1958), dissolved in 25 ml. of methylene chloride is reacted with stirring in a batch process with 2.0 grams of difluorodiazirine at −78° C. The low temperature is extremely important in this reaction owing to the high reactivity of the phosphine. After stirring for 18 hours, the methylene chloride solvent is removed by distillation.

Column chromatography of the residue employing silica gel as the solid phase and mixtures of chloroform, ethyl acetate and methanol as the eluents is utilized for preliminary purification of the desired N-cyanophosphorus imide product. Final purification by recrystallization from butyl acetate affords about a 40 percent yield of a colorless solid melting at about 73–75° C. This material is identified as N - cyanotris(dimethylamino)phosphinimide by infrared spectroscopy.

The following table is illustrative of aminophosphines and thiophosphites and their respective products.

TABLE V

| Aminophosphine starting material | Product |
|---|---|
| (⟨N⟩—)₃POC₂H₅ (tri-piperidinyl phosphite) | (⟨N⟩—)₃P(OC₂H₅)=NCN |
| $(C_{12}H_{25}NH)_3P$ | $(C_{12}H_{25}NH)_3P=NCN$ |
| (indolinyl)₃P | (indolinyl)₃P=NCN |
| [2-methyl-indolinyl]₃P | [2-methyl-indolinyl]₃P=NCN |
| (⟨N⟩—)₂P–C₆H₅ | (⟨N⟩—)₂P(C₆H₅)=NCN |
| (⟨N⟩—)₂P–C₆H₄–Cl | (⟨N⟩—)₂P(C₆H₄Cl)=NCN |
| [N(CH₃)(C₆H₅)]₃P | [N(CH₃)(C₆H₅)]₃P=NCN |
| $CH_3O{-}C_6H_4{-}P[N(CH_2CH_2)_2]_2$ (morpholinyl) | $CH_3O{-}C_6H_4{-}P(=NCN)[N(CH_2CH_2)_2]_2$ |
| $(CH_3)_2N{-}P(OC_2H_5)_2$ | $(CH_3)_2N{-}P(OC_2H_5)_2{=}NCN$ |
| $[(C_2H_5)_2N]_2P{-}N(C_6H_5)_2$ (carbazolyl) | $[(C_2H_5)_2N]_2P(=NCN){-}N(C_6H_5)_2$ |
| $(C_2H_5S)_3P$ | $(C_2H_5S)_3P=NCN$ |
| $(C_6H_5S)_3P$ | $(C_6H_5S)_3P=NCN$ |
| $(C_2H_5O)_2P{-}S{-}C_2H_5$ | $(C_2H_5O)_2P(SC_2H_5)=NCN$ |
| $(C_{12}H_{25}S)_3P$ | $(C_{12}H_{25}S)_3P=NCN$ |
| $(Cl{-}C_6H_4{-}S)_3P$ | $(Cl{-}C_6H_4{-}S)_3P=NCN$ |
| (thienyl-S)₃P | (thienyl-S)₃P=NCN |

EXAMPLE 5

The compounds of the invention can also be prepared by reaction of substituted organic trivalent phosphorus derivatives with cyanogen azide. The following is a specific example of the preparation of an N-cyanophosphorus imide by this process, S,S,S-tributyltrithiophosphite being exemplary of all of the trivalent phosphorus derivatives which can be used to make the compounds of the invention.

To a solution of 2.72 grams of cyanogen azide (prepared by adding 2.6 grams of sodium azide to 4.2 grams of cyanogen bromide dissolved in 20 ml. of anhydrous acetonitrile) were added, dropwise, 11.92 grams of tributyltrithiophosphite dissolved in 10 ml. of benzene. After addition of the thiophosphite was complete, the mixture was allowed to stir at room temperature for about 2 hours, and thereafter the reaction mixture was filtered and the filtrate evaporated to dryness in vacuum. The residue, about 12.7 grams of yellow-colored amorphous solid material, was taken up in 50 ml. of chloroform and the solution was poured onto a silica gel column. The material was chromatographed using chloroform and ethyl acetate as eluants.

After a short forerun which was discarded, the relatively light-colored eluents from the column were collected as center cuts. These were evaporated to dryness, yielding N-cyano-S,S,S-tributyltrithiophosphoroimidate, a colorless oil. The structure is confirmed by infrared spectroscopy. The yield is about 64 percent of the theoretical.

The following table further illustrates preparation of specific N-cyanophosphorus imide compounds of the invention. In each case, the starting material is the respective trivalent phosphorus derivative having the same radicals attached to phosphorus as are found in the product. Essential process conditions are given. Column chromatography or recycllization from suitable solvents is employed for purification purposes.

The compounds of this invention are useful as insect repellents and insecticides. They can also be used as nematocides. For these purposes, they are applied directly to the particular insect, e.g. flies, mosquitoes, etc., in insecticidally effective amounts, or placed in the soil or other location where the insects are to be found. They may be applied as such, or preferably are employed with inert solids to form powders or suspended in a suitable liquid diluent. There can also be added surface active agents or wetting agents and inert solids in such liquid formulations. Desirably, about 0.25 to 1 percent by weight of surface active or wetting agent is employed, while the active ingredient, the organic N-cyanophosphorus imides of the invention, are added in amount of about 0.1 to 5 percent by weight of the entire composition.

As the liquid carrier there can be employed organic solvents, e.g. hydrocarbons such as benzene, toluene, xylene, kerosene, diesel oil, fuel oil, petroleum, naphtha and the like; ketones, e.g. acetone, methylethyl ketone, etc., chlorinated hydrocarbons such as carbon tetrachloride, chloroform, trichloroethylene and perchloroethylene, esters such as ethyl acetate, amyl acetate and butyl acetate, ethers, for example ethylene glycol monomethylether, and the like; alcohols, e.g. methanol, ethanol, isopropanol or amyl alcohol, ethylene glycol, propylene glycol and glycerine. Mixtures of water and organic solvents, as solutions or emulsions can likewise be employed. A very useful hydrocarbon solvent for the purpose is deodorized kerosene.

Undissolved or suspended in solvents, the compounds of the invention can be applied as aerosols, e.g. by dispersing them in air by means of a compressed gas such as air, dichlorodifluoromethane, trichlorofluoromethane or other low molecular weight halogenated alkanes.

Illustrating the repellent activity of the compounds of the invention against mosquitoes, the following tests were

TABLE VI

| Example | Product M.P. or B.P. | Process conditions Temp./time | Solvent |
|---|---|---|---|
| 6 | $(C_4H_9)_3P=NCN$ oil, $n_D^{24}=1.4813$ | 22° C./48 hrs. | Methylene dichloride. |
| 7 | $(CH_3O)_3P=NCN$ B.P. 69°/0.16 mm. | 22° C./72 hrs. | Methylene dichloride. |
| 8 | $(C_2H_5O)_3P=NCN$ | 22° C./100 hrs. | Carbon tetrachloride. |
| 9 | $(C_6H_5O)_3P=NCN$ M.P. 92.5–93.5° C. | 22° C./7 days | Benzene. |
| 10 | $(C_{12}H_{25}S)_3P=NCN$ oil | 22° C./7 days | Chloroform. |
| 11 | $O_2N\text{-}C_6H_4\text{-}O\text{-}P(OCH_3)_2=NCN$ oil | 22° C./7 days | Benzene. |
| 12 | $N\equiv C\text{-}C_6H_4\text{-}O\text{-}P(OCH_3)_2=NCN$ oil | 22° C./7 days | Methylene dichloride. |
| 13 | $Cl\text{-}C_6H_3(Cl)\text{-}O\text{-}P(OC_2H_5)_2=NCN$ oil | 22° C./7 days | Benzene. |
| 14 | $(CH_3)_2N\text{-}P(OCH_2CH_2SC_2H_5)(N(CH_3)_2)=NCN$ oil | −78° C./24 hrs. | Methylene dichloride. | carried out. About 3 grams of N-cyanotributylphosphinimide dissolved in 20 ml. of acetone were applied to a cotton stocking, a subject wearing the cotton stocking on his arm exposed it to active yellow fever mosquitoes, *Aedes aegypti* L., and stable flies, *Stomoxys calcitrans* L., at intervals throughout the test period. The insects were repelled from the stocking, and no individual insect of either type settled upon its surface for 9 days after the initial application.

The same compound was sprayed on the surface of granulated sugar, and the sugar was exposed to adult house flies. Two concentrations of application were used, 0.5 percent by weight and 0.1 percent by weight. The 0.5 percent by weight application gave 100 percent repellency whereas even at 0.1 percent by weight, the repellency was 55 percent.

In order to demonstrate more fully the insecticidal and nematocidal properties of the compounds of the invention, the following tests were carried out, and the results are shown in Table VII.

The minimal lethal concentration of the test chemicals to 2–4 day old mosquito larvae (*Aedes aegypti* L.) is determined. Mosquito eggs are hatched in distilled water. Dilutions of the test chemical are prepared in distilled water at 100, 10 and 1 mg./l., and 9.0 ml. portions are placed in 1-dram shell vials. One milliliter of water containing 4 to 8 mosquito larvae is added to each vial and inspected for death or other changes at intervals for one day.

In order to evaluate nematocidal activity of test chemicals, the minimum lethal concentration to *Panagrellus* sp. nematode worm is determined. *Panagrellus* is reared in oatmeal medium at a temperature of 5–10° C. Dilutions of the test chemical are prepared in distilled water at 100, 10 and 1 mg./l., and 9.0 ml. portions are placed in 1-dram shell vials. One milliliter of water containing 50 to 70 nema is added to each vial. The nema are observed for death or other changes at 24 and 72 hours.

TABLE VII

| Compound | Minimum lethal concentration, mg./l. (p.p.m.) | |
|---|---|---|
| | *Aedes aegypti* L. | *Panagrellus* sp. |
| $(CH_3O)_3P=NCN$ | 1 | 10 |
| $(C_4H_9S)_3P=NCN$ | 10 | --- |
| $(C_4H_9)_3P=NCN$ | 100 | 1 |
| $(C_6H_5)_3P=NCN$ | --- | 100 |
| $(C_6H_5O)_3P=NCN$ | 100 | --- |

| 10 | 100 |

In order to demonstrate further the insecticidal activity of the N-cyanophosphorus imides of the invention against insects other than mosquitoes, the following tests were carried out with $(CH_3O)_3P=NCN$. The sample was dissolved in acetone at concentrations of 10 and 5 mg./l. and dispersed in distilled water with the aid of an alkyl-aryl polyether alcohol wetting agent (available under the trademark "Triton X–100") as an emulsifier. The mixture is applied to the test insects as an aerosol. The results are shown in Table VIII.

TABLE VIII

| Compound | Concentration, mg./l. | Percent mortality | | | |
|---|---|---|---|---|---|
| | | House flies | | Pea aphids, 48 hrs. | Mites, 5 days |
| | | 2 hrs. | 24 hrs. | | |
| $(CH_3O)_3P=NCN$ | 10 | 50 | 100 | 90 | 61 |
| | 5 | 60 | 96 | 20 | --- |
| Untreated control | | 0 | 0 | 0 | 0 |

What is claimed is:

1. A compound having the formula

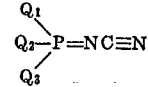

wherein $Q_1$, $Q_2$, and $Q_3$ are β-hydroxyethyl, 2-hydroxypropyl, octyl, m-chlorophenyl, propenyl, isobutenyl, chloromethyl, benzyl, o-methoxyphenyl, o-, m-, p-trimethylphenyl, α-naphthyl, 3-indolyl, 9-bromoanthracyl, 4-biphenyl, butyl, p-(dimethylamino)-phenyl, or p-(diethylamino)-phenyl phenyl dimethylamino; or wherein $Q_1$ and $Q_2$ are methyl and $Q_3$ is p-bromophenyl, or β-phenethyl p-phenoxy-phenyl; or wherein $Q_1$ and $Q_2$ are ethyl and $Q_3$ is tolyl, p-hydroxyphenyl, or 2-thienyl; or wherein $Q_1$ and $Q_2$ are phenyl and $Q_3$ is o-(methoxymethyl)-β-phenethyl, m-carboxyphenyl or hexadecyl; or wherein $Q_1$ and $Q_2$ are butyl and $Q_3$ is (N,N-dimethylamino)-phenyl; or wherein $Q_1$ and $Q_2$ are 2-pyridyl and $Q_3$ is phenyl; or wherein $Q_1$ and $Q_2$ are allyl and $Q_3$ is p-bromophenyl; or wherein $Q_1$ is p-methoxyphenyl, $Q_2$ is p-bromophenyl, and $Q_3$ is phenyl.

2. The compound N-cyanotriphenylphosphinimide, according to claim 1.

3. The compound N-cyanotributylphosphinimide, according to claim 1.

4. The compound N-cyanotris (dimethylamino) phosphinimide, according to claim 1.

5. Process for producing a compound according to claim 1, which comprises reacting a compound having the formula $$Q_2-\overset{Q_1}{\underset{Q_3}{P}}$$

in which $Q_1$, $Q_2$ and $Q_3$ have the same significance as set forth in claim 1, with difluorodiazirine in the presence of an inert solvent.

References Cited

Marsh et al.: JACS, vol. 86, p. 4506 (1964).

HARRY I. MOATZ, Primary Examiner

U.S. Cl. X.R.

260—239 E, 298 R, 293.69, 293.75, 294.9, 309, 319.1, 326.15, 329 P, 347.7, 348 R, 518 R, 576, 606.5 P, 920, 928, 936, 940, 947, 951, 954, 955, 956, 959; 424—200, 202, 203, 204, 205, 209, 210, 211; 71—86, 87; 252—60, 388, 389, 390; 260—551 P

UNITED STATES PATENT OFFICE
CERTIFICATE OF CORRECTION

Patent No. 3,776,950  Dated December 4, 1973

Inventor(s) Ronald A. Mitsch

It is certified that error appears in the above-identified patent and that said Letters Patent are hereby corrected as shown below:

Col. 8, Table II, right side of Table, equa. 9 should read:

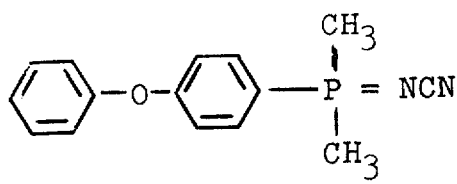

instead of:

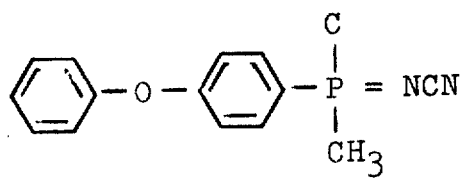

Table VI, 4th line, Col. 17 reads:

oil, $nD^{24} = 1.4813$ should read:

oil, $n^{24}D = 1.4813$

Signed and sealed this 23rd day of April 1974.

(SEAL)
Attest:

EDWARD M. FLETCHER, JR.
Attesting Officer

C. MARSHALL DANN
Commissioner of Patents